US011455946B2

(12) United States Patent
Hyeon

(10) Patent No.: US 11,455,946 B2
(45) Date of Patent: Sep. 27, 2022

(54) DISPLAY DEVICE AND CONTROLLING METHOD OF DISPLAY DEVICE

(71) Applicant: SAMSUNG ELECTRONICS CO., LTD., Suwon-si (KR)

(72) Inventor: Byeongcheol Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/224,529

(22) Filed: Apr. 7, 2021

(65) Prior Publication Data

US 2021/0225270 A1 Jul. 22, 2021

Related U.S. Application Data

(63) Continuation of application No. 16/562,626, filed on Sep. 6, 2019, now Pat. No. 11,074,852.

(30) Foreign Application Priority Data

Sep. 6, 2018 (KR) ........................ 10-2018-0106438

(51) Int. Cl.
*G09G 3/32* (2016.01)
*G09G 3/3258* (2016.01)
(Continued)

(52) U.S. Cl.
CPC ......... *G09G 3/32* (2013.01); *G09G 2300/026* (2013.01); *G09G 2300/0452* (2013.01);
(Continued)

(58) Field of Classification Search
CPC ................ H04W 52/0235; G09G 3/32; G09G 2300/026; G09G 2300/0452;
(Continued)

(56) References Cited

U.S. PATENT DOCUMENTS 8,106,902 B2 1/2012 Ishii et al.
8,922,458 B2 12/2014 Sefton et al.
(Continued)

FOREIGN PATENT DOCUMENTS

CN 104538001 A * 4/2015 ........... G09G 3/3696
CN 105139814 A * 12/2015 .............. G09G 3/36
(Continued)

OTHER PUBLICATIONS

Communication dated Apr. 23, 2021 issued by the European Patent Office in European Application No. 19195448.6.
(Continued)

*Primary Examiner* — Lin Li
(74) *Attorney, Agent, or Firm* — Sughrue Mion, PLLC

(57) ABSTRACT

A display device includes a plurality of light emitting diodes and a plurality of pixel driver circuits for driving the plurality of light emitting diodes; a panel driver including a plurality of driver integrated circuits (ICs) and a first switching element; a timing controller including a second switching element; and a signal transmission line connecting the first switching element and the second switching element. The timing controller is configured to control the first switching element and the second switching element to transmit an image data signal from the timing controller to the panel driver through the signal transmission line during a first time period, and control the first switching element and the second switching element to receive a state data signal of the display panel from the panel driver through the signal transmission line during a second time period different from the first time period.

18 Claims, 10 Drawing Sheets

(51) Int. Cl.

| | |
|---|---|
| ***H04W 72/04*** | (2009.01) |
| ***G09G 3/20*** | (2006.01) |
| ***G09G 3/36*** | (2006.01) |

(52) U.S. Cl.

CPC . *G09G 2300/06* (2013.01); *G09G 2310/0221* (2013.01); *G09G 2310/0264* (2013.01); *G09G 2310/08* (2013.01); *G09G 2370/00* (2013.01)

(58) Field of Classification Search

CPC ........ G09G 2300/06; G09G 2310/0221–0264; G09G 2310/08; G09G 2370/00; G09G 3/3696

See application file for complete search history.

(56) References Cited

U.S. PATENT DOCUMENTS

| | | | | |
|---|---|---|---|---|
| 9,311,847 | B2 | 4/2016 | Hall | |
| 9,601,089 | B2 | 3/2017 | Choi | |
| 2004/0041777 | A1 | 3/2004 | Toyozawa et al. | |
| 2008/0001898 | A1 | 1/2008 | Chang | |
| 2009/0284509 | A1 | 11/2009 | Choe | |
| 2010/0085336 | A1 | 4/2010 | Yang et al. | |
| 2011/0043512 | A1* | 2/2011 | Ooga | G09G 3/3688 345/212 |
| 2012/0133635 | A1 | 5/2012 | Ji et al. | |
| 2012/0218316 | A1 | 8/2012 | Wang et al. | |
| 2014/0253535 | A1* | 9/2014 | Lim | G09G 3/20 345/213 |
| 2015/0035734 | A1* | 2/2015 | Lee | G09G 3/3659 345/76 |
| 2015/0161956 | A1 | 6/2015 | Lee et al. | |
| 2015/0243254 | A1 | 8/2015 | Choi | |
| 2015/0310835 | A1* | 10/2015 | Lee | G09G 3/2003 345/213 |
| 2016/0125840 | A1 | 5/2016 | Oh et al. | |
| 2016/0140935 | A1 | 5/2016 | Hwang et al. | |
| 2016/0155381 | A1 | 6/2016 | Kwon et al. | |
| 2016/0351129 | A1* | 12/2016 | Kim | G09G 3/3258 |
| 2017/0047001 | A1 | 2/2017 | Shin et al. | |
| 2017/0124958 | A1 | 5/2017 | Pyo et al. | |
| 2017/0187551 | A1* | 6/2017 | Lukanc | H04W 72/0413 |
| 2017/0193918 | A1 | 7/2017 | Bae | |
| 2018/0033375 | A1* | 2/2018 | Kang | G09G 3/3258 |
| 2018/0122294 | A1 | 5/2018 | Do et al. | |
| 2018/0219025 | A1* | 8/2018 | Takahashi | G09G 3/2092 |

FOREIGN PATENT DOCUMENTS

| | | | |
|---|---|---|---|
| EP | 3 316 241 | A1 | 5/2018 |
| JP | 2009-69421 | A | 4/2009 |
| JP | 2016-31431 | A | 3/2016 |
| KR | 10-1192858 | B1 | 10/2012 |
| KR | 10-2015-0101025 | A | 9/2015 |
| KR | 10-2016-0046042 | A | 4/2016 |
| KR | 10-2016-0053116 | A | 5/2016 |
| KR | 10-2017-0049735 | A | 5/2017 |
| KR | 10-1787974 | B1 | 10/2017 |

OTHER PUBLICATIONS

International Search Report (PCT/ISA/210) dated Dec. 18, 2019 issued by the International Searching Authority in International Application No. PCT/KR2019/011383.

Written Opinion (PCT/ISA/237) dated Dec. 18, 2019 issued by the International Searching Authority in International Application No. PCT/KR2019/011383.

Communication dated Jan. 2, 2020, issued by the European Patent Office in counterpart European Application No. 19195448.6.

* cited by examiner

DISPLAY DEVICE AND CONTROLLING METHOD OF DISPLAY DEVICE

CROSS-REFERENCE TO RELATED APPLICATION(S)

This application is a continuation of U.S. patent application Ser. No. 16/562,626, filed on Sep. 6, 2019, in the U.S. Patent and Trademark Office, which is based on and claims priority under 35 U.S.C. § 119(a) to Korean Patent Application No. 10-2018-0106438, filed on Sep. 6, 2018, in the Korean Intellectual Property Office, the disclosures of which are incorporated by reference herein in their entireties.

BACKGROUND

1. Field

The disclosure relates to a display device and a controlling method of the display device, and more particularly, to a data communication structure of the display device and the method thereof.

2. Description of Related Art

In the field of light emitting diode (LED) display, driving of a display panel may be performed by a panel driver including a driver integrated circuit (IC), and transmission of a data signal for a panel driver may be performed through a timing controller.

Generally, signal transmission for transmitting an image data signal from a timing controller to a panel driver, and transmission of a data signal including a state of a display panel from a panel driver to a timing controller are performed through separate signal transmission lines.

Recently, pitches among pixels constituting an LED display panel have been gradually decreasing, and accordingly, the number of signal transmission lines included in a display panel of the same size has increased.

However, there is a problem of stability in connecting lines due to the increase in the number of signal transmission lines between a timing controller and a panel driver. Due to the increase in the number of transmission lines, the problem of increased complexity inside a display device, a rise in cost, and etc. need to be solved.

SUMMARY

Provided are a data communication structure of a display device and a method thereof.

In accordance with an aspect of the disclosure, there is provided display device including: a display panel including a plurality of light emitting diodes and a plurality of pixel driver circuits for driving the plurality of light emitting diodes; a panel driver configured to control operations of the plurality of pixel driver circuits, the panel driver including a plurality of driver integrated circuits (ICs) and a first switching element; a timing controller including a second switching element; and a signal transmission line connecting the first switching element and the second switching element, wherein the timing controller is configured to control the first switching element and the second switching element to transmit an image data signal from the timing controller to the panel driver through the signal transmission line during a first time period, and control the first switching element and the second switching element to receive a state data signal of the display panel from the panel driver through the signal transmission line during a second time period different from the first time period.

The timing controller may be further configured to control the first switching element and the second switching element to select any one of a plurality of signal transmission lines to transmit the image data signal or receive the state data signal.

The panel driver may further include the plurality of driver ICs connected by a daisy chain method, wherein based on a first driver IC among the plurality of driver ICs receiving the image data signal from the timing controller, the first driver IC is configured to transmit the received image data signal to a second driver IC directly connected to the first driver IC among the plurality of driver ICs, and based on the second driver IC receiving the image data signal from the first driver IC, the second driver IC is configured to transmit a state data signal of the display panel to the timing controller.

The display panel may be divided into a plurality of groups according to a number of a plurality of pixels constituting the display panel, and the first switching element may be connected to a plurality of signal transmission lines corresponding to each of the plurality of groups, and may be connected to the plurality of driver ICs included in each of the plurality of groups.

The second time period may be shorter than the first time period.

The state data signal may include error information of the display panel and monitoring information of the display panel.

The display device may be a modular display device including a plurality of display modules that are physically connected to each other, and each of the plurality of display modules may include the display panel and the panel driver.

The display panel may further include a plurality of pixels arranged in the form of a matrix, each of the plurality of pixels including an R sub pixel including a red light emitting diode, a G sub pixel including a green light emitting diode, and a B sub pixel including a blue light emitting diode, and the pixel driver circuits may be formed with respect to each of the R sub pixel, the G sub pixel, and the B sub pixel.

The display panel may be driven by a passive matrix method through the panel driver.

In accordance with an aspect of the disclosure, there is provided a controlling method of a display device, the controlling method including: transmitting, through a signal transmission line connecting a timing controller and a panel driver, an image data signal from the timing controller to the panel driver during a first time period; and receiving, by the timing controller, a state data signal of a display panel from the panel driver through the signal transmission line during a second time period different from the first time period.

The controlling method may further include controlling a first switching element included in the panel driver and a second switching element included in the timing controller to select any one of a plurality of signal transmission lines to transmit the image data signal or receive the state data signal.

The controlling method may further include: based on a first driver integrated circuit (IC) among the plurality of driver ICs included in the panel driver receiving the image data signal from the timing controller, transmitting the received image data signal from the first driver IC to a second driver IC directly connected to the first driver IC among the plurality of drive ICs; and based on the second driver IC receiving the image data signal from the first driver IC, receiving at the timing controller a state data signal of the display panel from the second driver IC.

The display panel may be divided into a plurality of groups according to a number of a plurality of pixels constituting the display panel, and the first switching element may be connected to a plurality of signal transmission lines corresponding to each of the plurality of groups, and may be connected to the plurality of driver ICs included in each of the plurality of groups.

The second time period may be shorter than the first time period.

The state data signal may include error information of the display panel and monitoring information of the display panel.

The display device may be a modular display device including a plurality of display modules that are physically connected to each other, and each of the plurality of display modules may include the display panel and the panel driver.

The display panel may further include a plurality of pixels arranged in the form of a matrix, each of the plurality of pixels including an R sub pixel including a red light emitting diode, a G sub pixel including a green light emitting diode, and a B sub pixel including a blue light emitting diode, and the pixel driver circuits may be formed with respect to each of the R sub pixel, the G sub pixel, and the B sub pixel.

The display panel may be driven by a passive matrix method through the panel driver.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
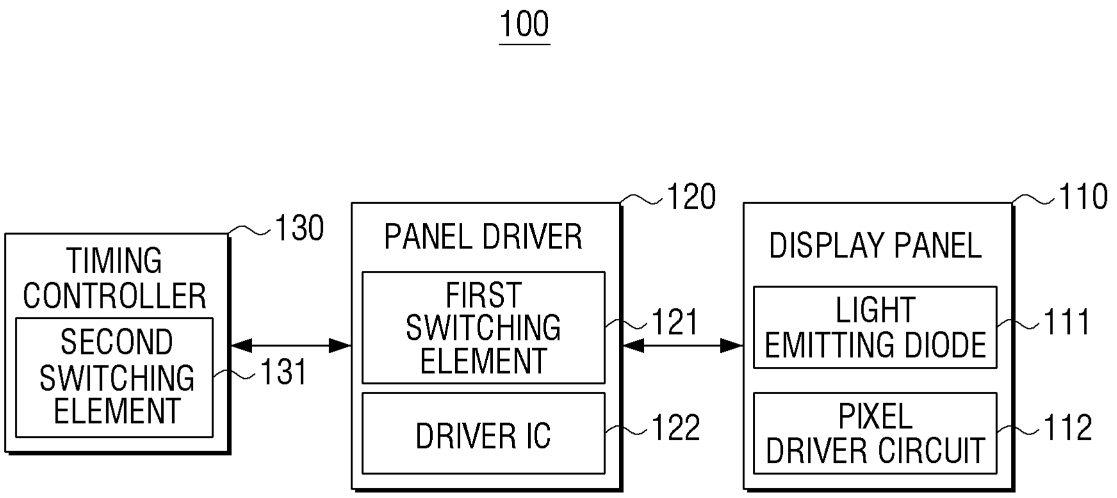
FIG. 1 is a block diagram illustrating a configuration of a display device according to an embodiment.

Various modifications may be made to the embodiments, and there may be various types of embodiments. Accordingly, specific embodiments will be illustrated in drawings, and the embodiments will be described in detail. However, it should be noted that the various embodiments do not limit the scope to a specific embodiment, but they should be interpreted to include various modifications, equivalents, and/or alternatives of the embodiments. With respect to the detailed description of the drawings, similar components may be designated by similar reference numerals.

In addition, the embodiments below may be modified in various different forms, and the scope of the technical idea of the disclosure should not be limited to the embodiments below. Rather, these embodiments are provided to make the disclosure more sufficient and complete, and to fully convey the technical idea of the disclosure to those skilled in the art.

Further, the terms used in the disclosure are used to explain specific embodiments of the disclosure, and are not intended to limit the scope of the disclosure. Also, singular expressions may include plural expressions, unless defined obviously differently in the context.

In the disclosure, expressions such as "have," "may have," "include," and "may include" should be construed as denoting characteristics of elements, such as numerical values, functions, operations, and components, and the expressions are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, the expressions "first," "second" and the like used in the disclosure may be used to describe various elements regardless of any order and/or degree of importance. Also, such expressions may be used only to distinguish one element from another element, and are not intended to limit the elements.

For example, the description in the disclosure that one element (e.g., a first element) is "operatively or communicatively coupled with/to" or "connected to" another element (e.g., a second element) should be interpreted to include both cases where the one element is directly coupled to another element, and where the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. The term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

In addition, in the embodiments, 'a module' or 'a part' may perform at least one function or operation, and these elements may be implemented as hardware or software, or as a combination of hardware and software. Further, a plurality of 'modules' or a plurality of 'parts' may be integrated into at least one module and implemented as at least one processor, except 'a module' or 'a part' that has to be implemented as specific hardware.

In the following description, the embodiments will be described in detail with reference to the accompanying drawings, to the extent that those having ordinary skill in the art can easily carry out the embodiments. However, the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a block diagram illustrating a configuration of a display device according to an embodiment.

As illustrated in FIG. 1, a display device 100 according to an embodiment may include a display panel 110, a panel driver 120, and a timing controller 130.

The display panel 110 may display an image by control of the panel driver 120. Also, the display panel 110 may include a plurality of light emitting diodes 111 and a plurality of pixel driver circuits 112 for driving each of the plurality of light emitting diodes 111.

Each of the plurality of light emitting diodes 111 may include a light emitting layer, an n-type semiconductor layer and a p-type semiconductor layer respectively laminated in the upper and lower parts of the light emitting layer, and may emit light by control of the panel driver 120.

Specifically, a light emitting layer may be located between an n-type semiconductor and a p-type semiconductor, and is a layer in which an electron, a carrier of an n-type semiconductor, and a hole, a carrier of a p-type semiconductor, meet. If an electron and a hole meet on a light emitting layer, as the electron and the hole are recombined, a potential barrier is formed. Then, when the electron and the hole cross over the potential barrier and shift to a low energy level according to an applied voltage, light of a wavelength corresponding thereto may be generated.

The light emitting diode 111 may be a general light emitting diode (LED), and in particular, it may be a micro LED, which is a micro mini LED in a size of from 10 μm to 100 μm. However, the type of the light emitting diode is not particularly limited, and may be a light emitting diode that suits the purpose.

The plurality of pixel driver circuits 112 operate the plurality of light emitting diodes 111. Specifically, in the order that the plurality of pixel driver circuits 112 are electronically connected to the plurality of light emitting diodes 111, the plurality of light emitting diodes 111 may be respectively mounted on a driver circuit layer including the plurality of pixel driver circuits 112, and each of the plurality of light emitting diodes 111 may constitute the sub pixels of the display panel 110. Detailed explanation regarding the configuration of the pixels of the display panel 110 will be described below with respect to FIGS. 7A and 7B.

The panel driver 120 may control the operation of the display panel 110. Also, the panel driver 120 may include a plurality of driver integrated circuits (ICs) 122 and a first switching element 121.

Specifically, the plurality of driver ICs 122 included in the panel driver 120 may operate the plurality of pixel driver circuits 112, and thereby control light emission of the plurality of light emitting diodes 111 connected to each of the plurality of pixel driver circuits 112.

There is no special limitation on a method of operating the display panel 110 according to the disclosure. Specifically, the operation of the display panel 110 may be performed by a passive matrix method, or by an active matrix method.

Also, the panel driver 120 may further include a graphic RAM (GRAM) and power generating circuits. Here, the graphic RAM may perform a role of a memory that temporarily stores data to be input to the driver ICs 122. The power generating circuits may perform a role of generating a voltage for operating the display panel 110 and providing the voltage to the driver ICs 122.

The timing controller 130 may control the panel driver 120. Specifically, the timing controller 130 may adjust an image data signal to a signal required at the panel driver 120, and transmit the adjusted signal to the panel driver 120. Also, the timing controller 130 may include a second switching element 131. In addition, the timing controller 130 may further include a field programmable gate array (FPGA) or an application specific integrated circuit (ASIC), and etc.

The timing controller 130 generally performs serial communication with the panel driver 120. Specifically, communication between the timing controller 130 and the panel driver 120 may be performed through transmission of a clock signal, a signal data in (SDI) signal, and a signal data out (SDO) signal. In particular, the timing controller 130 may transmit an image data signal to the panel driver 120, and the timing controller 130 may receive a data signal regarding a state of the display panel 110 from the panel driver 120.

According to an embodiment, the panel driver 120 and the timing controller 130 may include a first switching element 121 and a second switching element 131, respectively. The first switching element 121 and the second switching element 131 may be switching elements such as a single pole double through (SPDT) switch. Also, the first switching element 121 and the second switching element 131 may be connected through a signal transmission line.

In addition, the timing controller 130 may control the first switching element 121 and the second switching element 131 to select any one of a plurality of signal transmission lines to transmit an image data signal or receive a state data signal.

Specifically, the timing controller 130 may control the first switching element 121 and the second switching element 131, and transmit an image data signal from the timing controller 130 to the panel driver 120 through a signal transmission line during a first time period.

Also, the timing controller 130 may control the first switching element 121 and the second switching element 131, and receive a state data signal regarding the display panel 110 from the panel driver 120 through a signal transmission line that is identical to the signal transmission line transmitting the image data signal during a second time period different from the first time period.

Here, the state data signal may include error information and monitoring information regarding the display panel 110. Hereinafter, for the convenience of explanation, a state data signal regarding the display panel 110 may simply be referred to as a "state data signal."

Furthermore, the timing controller 130 as described above may be referred to as a timing controller (T-CON), a data hub, a receiving card, a controller, etc. in the pertinent art, but it is obvious that a component that can control the panel driver 120 in a scope of achieving the purpose of the disclosure may be applied to the disclosure regardless of its name.

The display device 100 according to the disclosure may further include a processor that is capable of controlling the overall operations of the display device 100. Specifically, the processor may transmit various control command signals, and thereby control the aforementioned operations of the timing controller 130, the panel driver 120, and the display panel 110.

Also, it was described that the communication between the timing controller 130 and the panel driver 120 may be performed through one signal transmission line, but this was only for clearly explaining the transmission of an image data signal from the timing controller 130 to the panel driver 120. The transmission of a state data signal from the panel driver 120 to the timing controller 130 may be performed through the same or different signal transmission line.

Specifically, a plurality of groups constituting the timing controller 130 and the panel driver 120 may be connected through a plurality of signal transmission lines, and for each of the plurality of groups, transmission of an image data signal and transmission of a state data signal may be performed through the same signal transmission line.

Hereinafter, transmission of a signal between the plurality of groups constituting the panel driver 120 and the timing controller 130, and transmission of a signal through a plurality of driver ICs 122 in the plurality of groups constituting the panel driver 120 will be described in detail.

FIGS. 2 to 5 are diagrams for illustrating in detail transmission of a data signal between a timing controller and a panel driver according to an embodiment.

Figure 2:
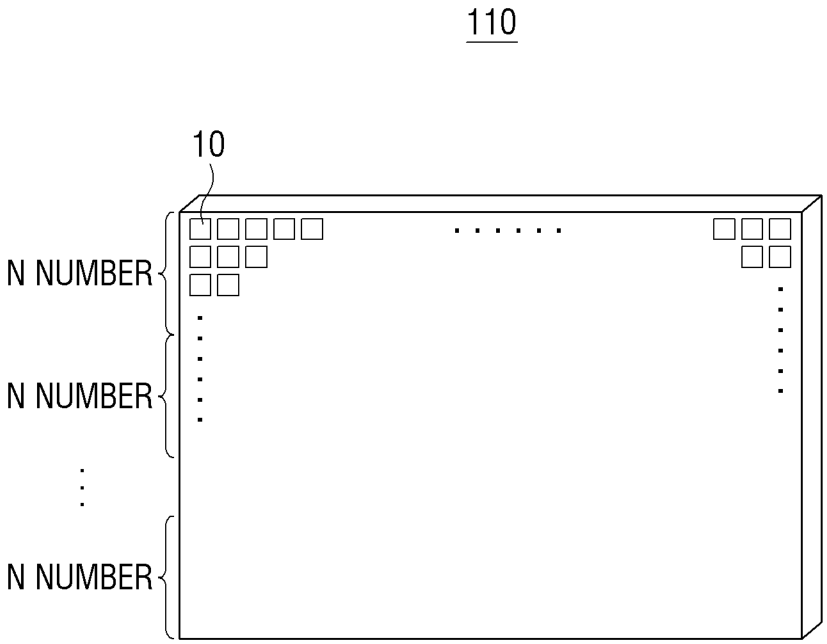
FIG. 2 is a diagram illustrating a plurality of groups of pixels dividing a display panel according to an embodiment.

Specifically, FIG. 2 is a diagram illustrating a plurality of groups dividing a display panel according to an embodiment.

Figure 3:
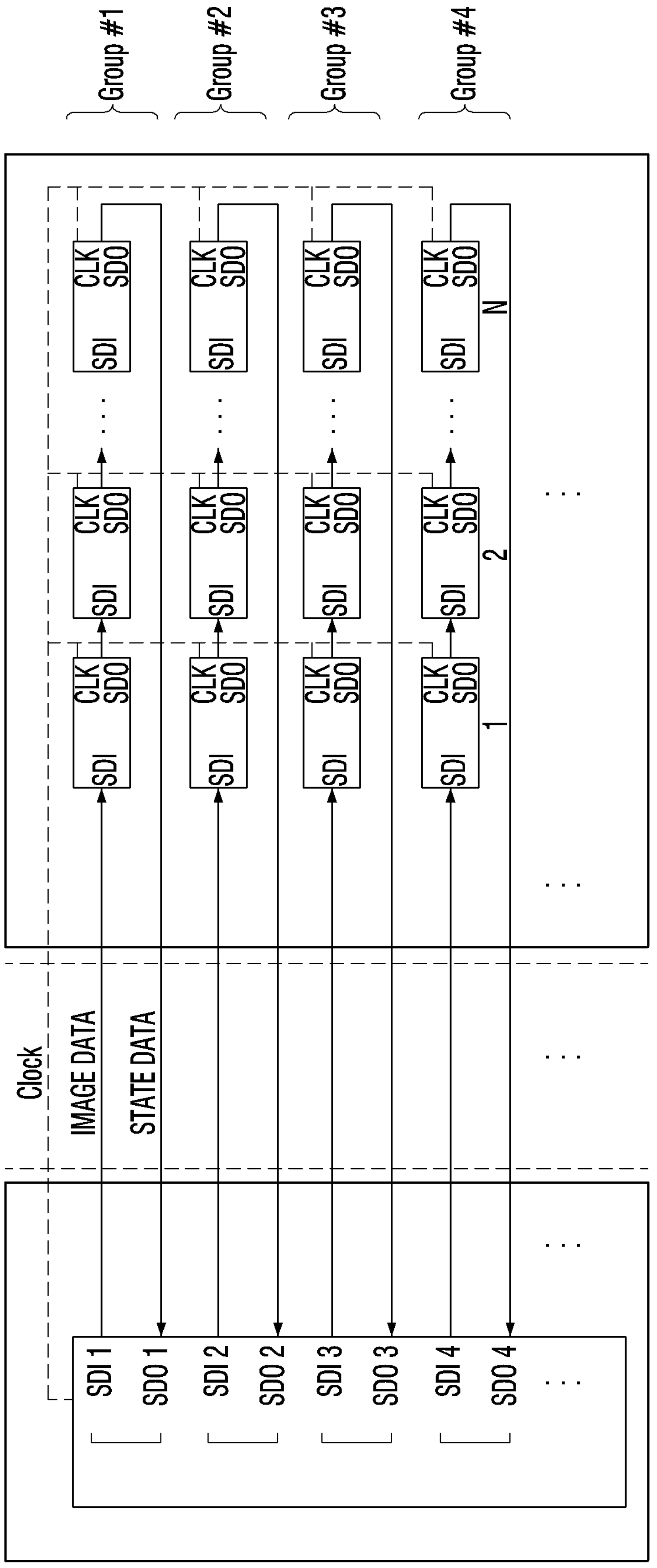
FIG. 3 (RELATED ART)
FIG. 3 is a diagram illustrating transmission of a data signal between a timing controller and a panel driver according to the related art.
Figure 4:
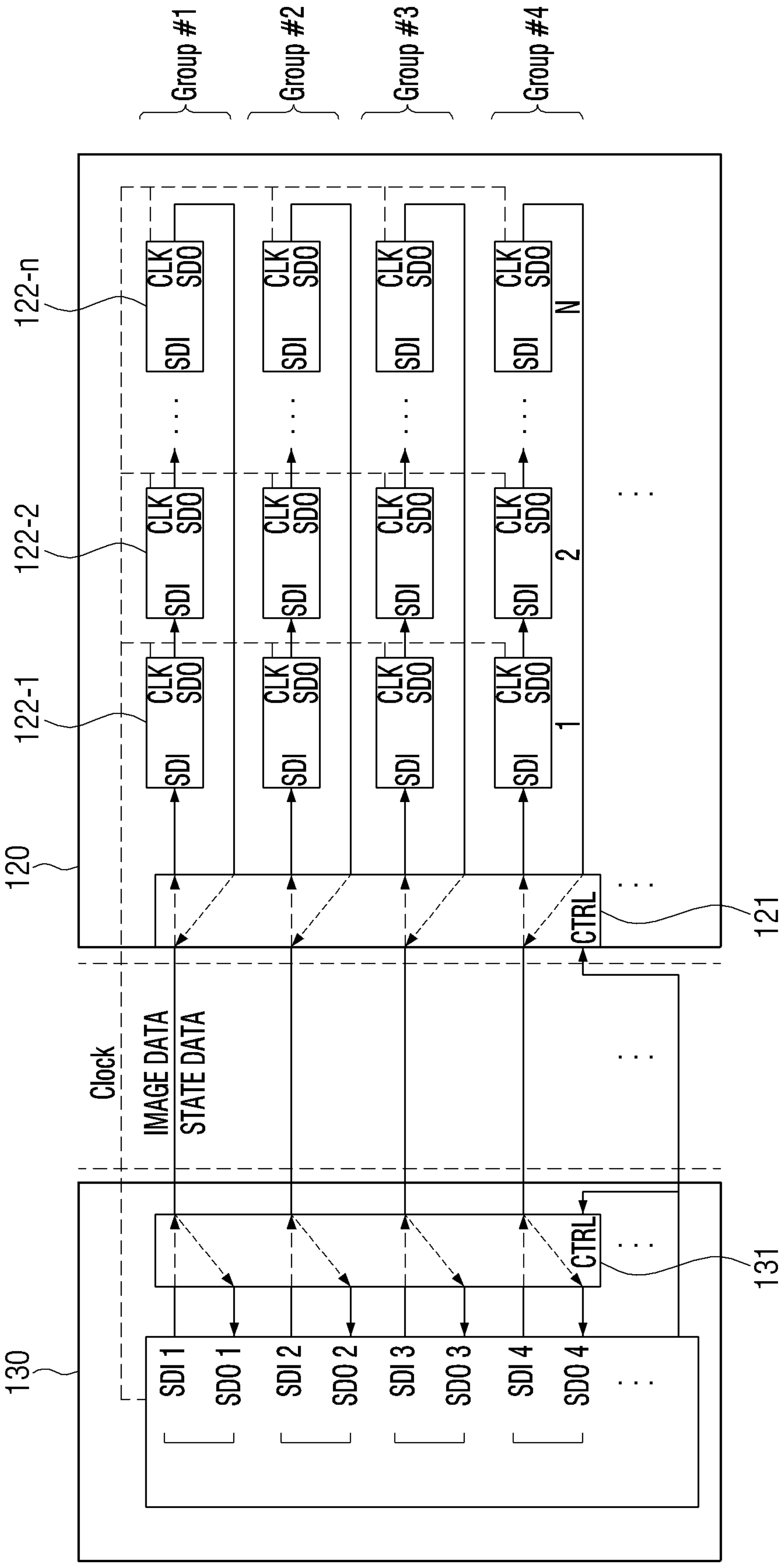
FIG. 4 is a diagram illustrating in detail transmission of a data signal between a timing controller and a panel driver according to an embodiment.

FIG. 3 is a diagram illustrating transmission of a data signal between a timing controller and a panel driver according to the related art, and FIG. 4 is a diagram illustrating in detail transmission of a data signal between a timing controller and a panel driver according to an embodiment.

Figure 5:
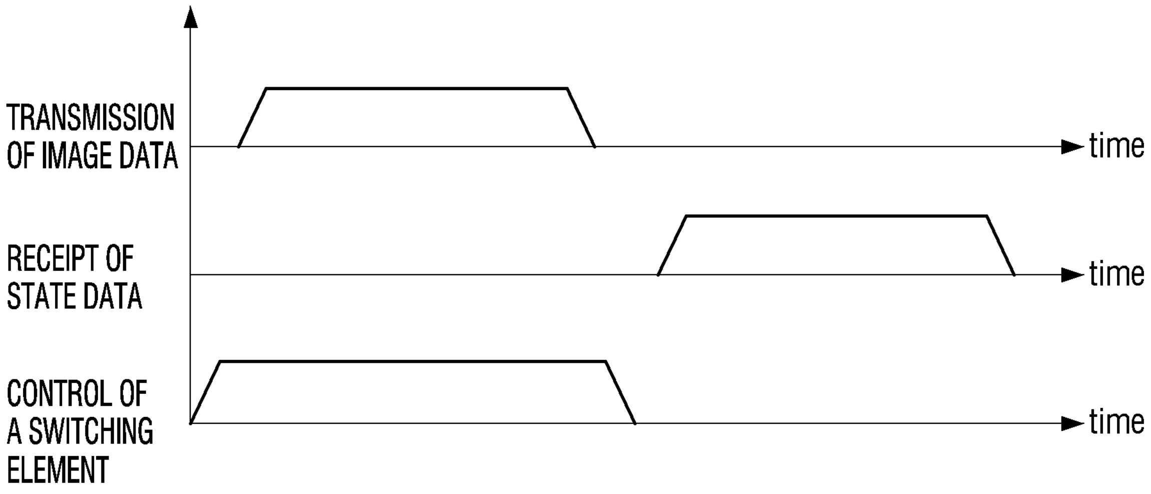
FIG. 5 is a diagram illustrating a method of controlling transmission time of an image data signal and transmission time of a state data signal according to an embodiment.

FIG. 5 is a diagram illustrating a method of controlling transmission time of an image data signal and transmission time of a state data signal according to an embodiment.

Referring to FIG. 2, the display panel 110 may be divided into a plurality of groups according to the number of a plurality of pixels 10 constituting the display panel 110. Specifically, as illustrated in FIG. 2, the display panel 110 may include a plurality of pixels 10 arranged in the form of a matrix, and may be divided into a plurality of groups according to the number of rows constituting the plurality of pixels 10.

For example, the display panel 110 according to an embodiment may include 240 pixels in width and 120 pixels in height. Also, the display panel 110 may be divided into 4 groups based on 30 rows constituting the plurality of pixels 10. Alternatively, the number of pixels 10 for each group may be selected variously according to the design of the display panel 110.

Further, as the display panel 110 is divided into a plurality of groups, the plurality of driver ICs 122 included in the panel driver 120 may also be divided into a plurality of groups. For example, as illustrated in FIGS. 3 and 4, each of the plurality of groups may include a first driver IC 122-1, a second driver IC 122-2, . . . and an n-th driver IC **122-*n*. In addition, as illustrated in FIGS. 3 and 4, the plurality of driver ICs 122** included in each of the plurality of groups may be connected by a daisy chain method.

Furthermore, as illustrated in FIGS. 3 and 4, the timing controller 130 and the panel driver 120 may include a clock pin, a signal data in (SDI) pin, and a signal data out (SDO) pin used in serial communication between the timing controller 130 and the panel driver 120. For each of the plurality of groups constituting the panel driver 120, a plurality of signal transmission lines for transmission of a data signal between the timing controller 130 and the panel driver 120 may be connected.

Specifically, as illustrated in FIG. 3, in the related art, transmission of data of an image signal and transmission of state data for each of a plurality of groups are performed through separate signal transmission lines that are different from each other. In contrast, as illustrated in FIG. 4, according to one or more embodiments, transmission of data of an image signal and transmission of state data for each of a plurality of groups are performed through the same signal transmission line.

That is, the time period in which an image data signal is transmitted from the timing controller 130 to the panel driver 120, and the time period in which the timing controller 130 receives a state data signal regarding the display panel 110 from the panel driver 120 may be distinguished, and an image data signal and a state data signal regarding the display panel 110 may be transmitted through one signal transmission line.

For distinguishing the time period in which an image data signal is transmitted and the time period in which a state data signal is transmitted, as illustrated in FIG. 4, the panel driver 120 includes a first switching element 121, and the timing controller 130 includes a second switching element 131. The first switching element 121 included in the panel driver 120 may be connected to a plurality of signal transmission lines corresponding to each of a plurality of groups. In addition, the first switching element 121 included in the panel driver 120 may be connected to a plurality of driver ICs 122 included in each of a plurality of groups.

According to an embodiment, transmission of a data signal between the timing controller 130 and the panel driver 120 having the aforementioned configurations may be performed through processes described below.

The timing controller 130 may control the first switching element 121 and the second switching element 131 such that any one of the paths for transmission of an image data signal or receipt of a state data signal may be selected.

Specifically, the timing controller 130 may control the first switching element 121 and the second switching element 131, and the timing controller 130 may transmit an image data signal to a first driver IC 122-1 among a plurality of driver ICs 122 included in each of a plurality of groups through a signal transmission line during a first time period.

As described above, processes after transmitting an image data signal to a first driver IC 122-1 included in each of a plurality of groups may involve the same processes for each of the plurality of groups. Hereinafter, a process of transmitting a signal performed in each of the plurality of groups will be described.

If a first driver IC 122-1 among a plurality of driver ICs 122 receives an image data signal from the timing controller 130, the received image data signal by the first driver IC 122-1 may be transmitted to a second driver IC 122-2 directly connected to the first driver IC 122-1 among the plurality of driver ICs 122.

Also, when the second driver IC 122-2 receives the image data signal from the first driver IC 122-1, the received image data signal by the second driver IC 122-2 may be transmitted a third driver IC directly connected to the second driver IC 122-2 among the plurality of driver ICs 122.

According to an embodiment, if an image data signal is consecutively transmitted from the first driver IC 122-1 to an n-th driver IC **122-*n*, a state data signal regarding the display panel 110 may be transmitted from the n-th driver IC 122-*n* to the timing controller 130**.

Furthermore, the aforementioned overall communication processes between the timing controller 130 and the panel driver 120 may be synchronized through a clock signal transmitted from the timing controller 130 to each of the plurality of driver ICs 122 included in the panel driver 120.

Specifically, the timing controller 130 may control the first switching element 121 and the second switching element 131 such that any one of the paths for transmission of an image data signal or receipt of a state data signal may be selected. Accordingly, the timing controller may control transmission time of an image data signal and transmission time of a state data signal.

As illustrated in FIG. 5, the first switching element 121 and the second switching element 131 may be controlled as two kinds of logic states. That is, the timing controller 130 may control the first switching element 121 and the second switching element 131 to have a logic state high (H) and a logic state low (Low), respectively.

Then, according to the logic state of each element, the time period in which an image data signal is transmitted from the timing controller 130 to the panel driver 120, and the time period in which a state data signal regarding the display panel is transmitted from the panel driver 120 to the timing controller 130 may be distinguished from each other.

Specifically, during a first time period in which both of the first switching element 121 and the second switching element 131 are in a logic state H, the timing controller 130 may transmit an image data signal from the timing controller 130 to the panel driver 120. In contrast, during a second time period wherein both of the first switching element 121 and the second switching element 131 are in a logic state L, the timing controller 130 may receive state data regarding the display panel 110 from the panel driver 120.

FIG. 5 illustrates a case where a first time period in which an image data signal is transmitted from the timing controller 130 to the panel driver 120 and a second time period in which a state data signal is transmitted from the panel driver 120 to the timing controller 130 are identical. However, according to another embodiment, a second time period may be shorter than a first time period.

That is, it is also possible that a time period in which a state data signal regarding the display panel 110 is transmitted from the panel driver 120 to the timing controller 130 may be implemented to be shorter than a time period in which an image data signal is transmitted from the timing controller 130 to the panel driver 120.

Otherwise, if a time period is within a range where effective transmission of an image data signal and a state data signal can be performed, the aforementioned transmission time of an image data signal and a state data signal may be modified variously.

According to an embodiment, transmission of an image data signal from the timing controller 130 to the panel driver 120, and transmission of a state data signal from the panel driver 120 to the timing controller 130 may be performed through the same signal transmission line, and accordingly, the number of data signal connections between the timing controller 130 and the panel driver 120 may be reduced by half.

Accordingly, the problem of stability in connecting lines due to the increase of the number of signal transmission lines between the timing controller 130 and the panel driver 120, the problem of increased complexity inside the display device 100, and the problem of cost increase can be solved, while pitches among the pixels 10 constituting the LED display panel 110 are decreased.

Further, as the number of data signal connections between the timing controller 130 and the panel driver 120 is reduced by half, generation of heat of the display device 100 can also be reduced.

Figure 6A:
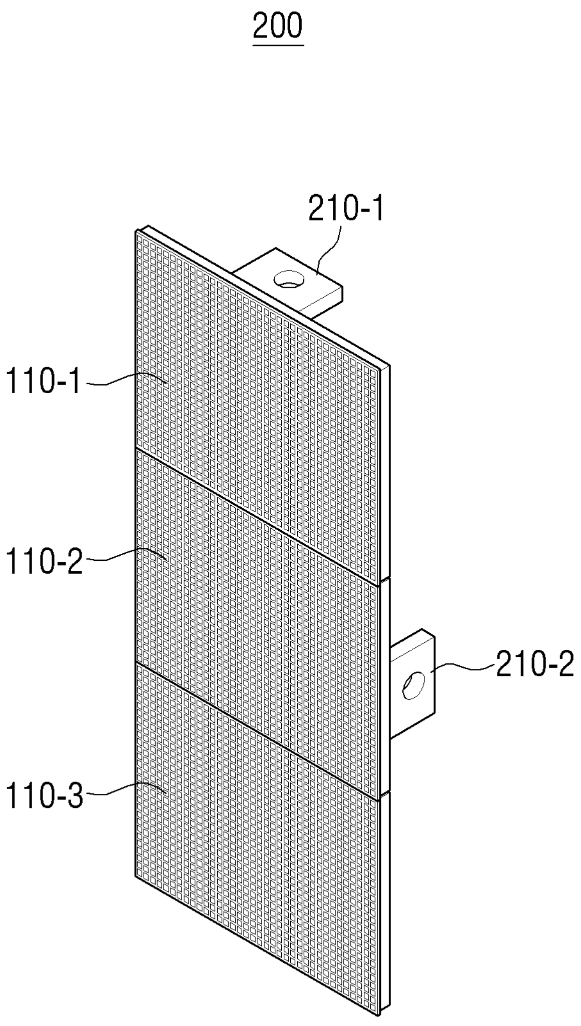
FIG. 6A is a diagram illustrating a display device implemented as a modular display according to an embodiment.
Figure 6B:
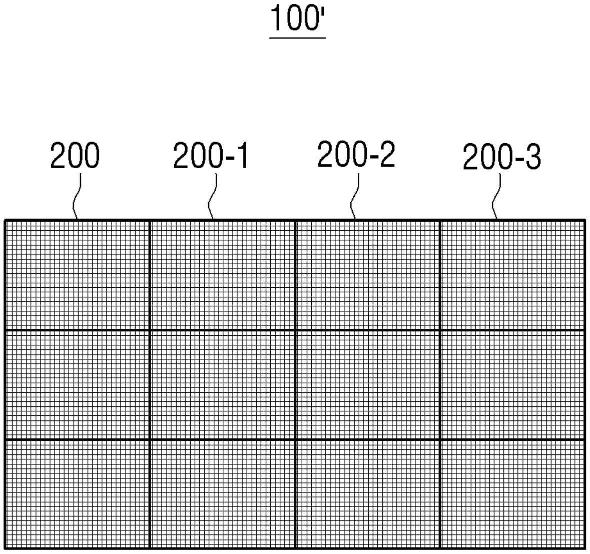
FIG. 6B is another diagram illustrating a display device implemented as a modular display according to an embodiment.

FIGS. 6A and 6B are diagrams illustrating a display device implemented as a modular display according to an embodiment.

The display device 100 may be a modular display device 100' wherein a plurality of display modules 110-1, 110-2, 110-3 may be physically connected, and each of the plurality of display modules 110-1, 110-2, 110-3 may include a display panel 110 and a panel driver 120.

As illustrated in FIG. 6A, the modular display device 100' according to an embodiment may include a cabinet 200. Also, the cabinet 200 may include a plurality of display modules 110-1, 110-2, 110-3. In addition, each of the plurality of display modules 110-1, 110-2, 110-3 may include a display panel 110 and a panel driver 120 as described above with respect to FIGS. 1 to 5.

In FIG. 6A, the plurality of display modules 110-1, 110-2, 110-3 are combined in an arrangement of 1×3, as an example of the cabinet 200. However, the arrangement form and the number of the display modules 110-1, 110-2, 110-3 may be modified variously.

The cabinet 200 may include a base plate in which each of the plurality of display modules 110-1, 110-2, 110-3 may be mounted. Also, each of the display modules 110-1, 110-2, 110-3 may be mounted on the front surface of the base plate.

Accordingly, the cabinet 200 according to an embodiment may be implemented as a bezeless form, and the modular display device 100' in which a plurality of cabinets 200 are combined, a seamless image that has no discontinuity among the plurality of cabinets 200 may be displayed.

The cabinet 200 may include a plurality of connecting parts 210-1, 210-2 that may be combined with another cabinet 200. Accordingly, the cabinet 200 may be implemented as a modular display device 100' through a combination with another cabinet 200.

For example, referring to FIG. 6B, the cabinet 200 may be combined with a plurality of other cabinets 200-1, 200-2, 200-3 in an arrangement of 4×1, and implemented as a modular display device 100', like a video wall. However, the arrangement form and the number of the cabinets 200, 200-1, 200-2, 200-3 may be modified variously.

According to an embodiment, the timing controller 130 may be implemented such that one timing controller 130 is provided for each of the plurality of cabinets 200, 200-1, 200-2, 200-3, and the one timing controller 130 provided for each of the cabinets 200, 200-1, 200-2, 200-3 may control the panel drivers 120 included in the plurality of display modules 110-1, 110-2, 110-3 constituting the cabinets 200, 200-1, 200-2, 200-3. However, the number of the timing controllers 130 may also be modified variously according to the design.

According to various embodiments, the number of data signal connections between the timing controller 130 and the panel driver 120 can be reduced by half, and an effect resulting therefrom will be more apparent in the case of a large-size display device like the modular display device 100'.

Figure 7A:
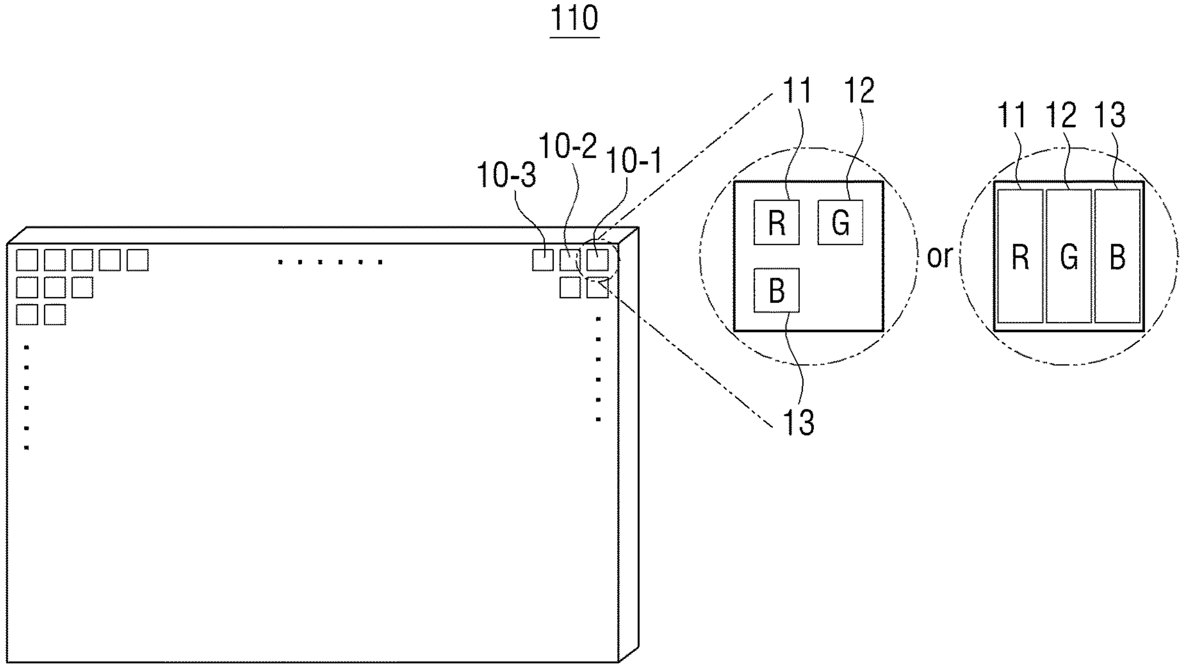
FIG. 7A is a diagram illustrating a configuration of a pixel of a display panel according to an embodiment.
Figure 7B:
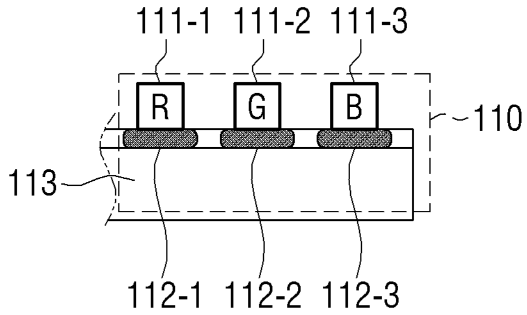
FIG. 7B is a diagram illustrating a configuration of a pixel of a display panel according to an embodiment.

FIGS. 7A and 7B are diagrams illustrating a configuration of a pixel of a display panel according to an embodiment.

Referring to FIG. 7A, the display panel 110 may include a plurality of pixels 10-1, 10-2, 10-3 arranged in the form of a matrix. Also, each of the plurality of pixels 10-1, 10-2, 10-3 may include an R sub pixel 11, a G sub pixel 12, and a B sub pixel 13.

Specifically, as illustrated in FIG. 7A, the R, G, and B sub pixels 11, 12, 13 may be arranged in the form of a matrix or may be arranged sequentially in one pixel 10. However, the plurality of sub pixels 11, 12, 13 may be arranged in various forms in each pixel 10-1, 10-2, 10-3.

Referring to FIG. 7B, the display panel 110 may include light emitting diodes 111-1, 111-2, 111-3 constituting each of the plurality of sub pixels 11, 12, 13 and pixel driver circuits 112-1, 112-2, 112-3 for driving the light emitting diodes.

For example, the display panel 110 may include a red light emitting diode 111-1 constituting the R sub pixel 11, a green light emitting diode 111-2 constituting the G sub pixel 12, and a blue light emitting diode 111-3 constituting the B sub pixel 13.

Also, in the order that the plurality of pixel driver circuits 112-1, 112-2, 112-3 are electronically connected to the plurality of light emitting diodes 111-1, 111-2, 111-3, the plurality of light emitting diodes 111-1, 111-2, 111-3 may be respectively mounted on the plurality of pixel driver circuits 112-1, 112-2, 112-3 formed on one side of a substrate, and each of the plurality of light emitting diodes may constitute a sub pixel of the display panel 110.

Figure 8:
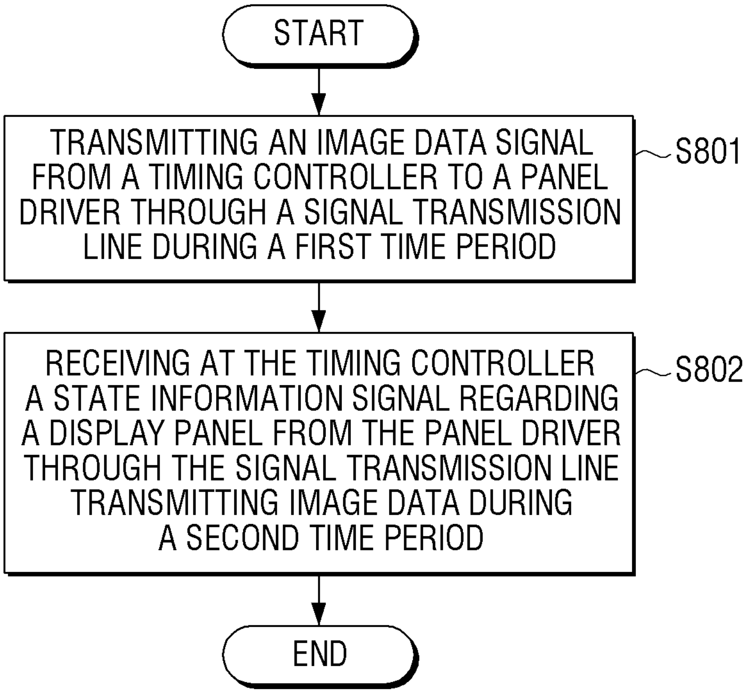
FIG. 8 is a flowchart illustrating a controlling method of a display device according to an embodiment.

FIG. 8 is a flowchart describing a controlling method of a display device according to an embodiment.

According to a controlling method of a display device 100, the method may include transmitting an image data signal from the timing controller 130 to the panel driver 120, through a signal transmission line connecting the timing controller 130 and the panel driver 120, during a first time period at operation S801.

Then, the timing controller 130 may receive a state data signal regarding the display panel 110 from the panel driver 120 through the signal transmission line during a second time period distinguished from the first time period at operation S802.

According to the controlling method, the first switching element 121 and the second switching element 131 may be controlled in an order that an image data signal and a state data signal regarding the display panel 110 can be transmitted through the same signal transmission line during different time periods.

Specifically, in accordance with an order that any one of the paths for transmission of an image data signal or receipt of a state data signal may be selected, the first switching element 121 included in the panel driver 120 and the second switching element 131 included in the timing controller 130 may be controlled.

Furthermore, if a first driver IC 122-1 among a plurality of driver ICs 122 included in the panel driver 120 receives an image data signal from the timing controller 130, the received image data signal may be transmitted from the first driver IC 122-1 to a second driver IC 122-2 directly connected to the first driver IC 122-1 among the plurality of driver ICs 122.

Also, when the second driver IC 122-2 receives the image data signal from the first driver IC 122-1, the timing controller 130 may receive a state data signal regarding the display panel 110 from the second driver IC 122-2.

According to the aforementioned various embodiments, transmission of an image data signal from the timing controller 130 to the panel driver 120, and transmission of a state data signal from the panel driver 120 to the timing controller 130 may be performed through the same signal transmission line, and accordingly, the number of data signal connections between the timing controller 130 and the panel driver 120 may be reduced by half.

Also, the problem of stability in connecting lines due to the increase of the number of signal transmission lines between the timing controller 130 and the panel driver 120, the problem of increased complexity inside the display device 100, and the problem of cost increase may be solved, while pitches among the pixels constituting the LED display panel 110 are decreased.

Further, as the number of data signal connections between the timing controller 130 and the panel driver 120 is reduced by half, generation of heat of the display device 100 can also be reduced.

The controlling method of the display device 100 may be implemented as a program and provided to the display device 100. In particular, a program including the controlling method of the display device 100 may be provided while being stored in a non-transitory computer readable medium.

A non-transitory computer readable medium may refer to a medium that stores data semi-permanently, and may be readable by machines, but not a medium that stores data for a short moment such as a register, a cache, and a memory. Specifically, the aforementioned various applications or programs may be provided while being stored in a non-transitory computer readable medium such as a CD, a DVD, a hard disc, a blue-ray disc, a USB, a memory card, a ROM, and the like.

While embodiments have been shown and described herein, the disclosure is not limited to the aforementioned specific embodiments, and it is apparent that various modifications may be made by those having ordinary skill in the art without departing from the gist of the disclosure as claimed by the appended claims. Also, it is intended that such modifications are not to be interpreted independently from the technical idea or prospect of the disclosure.

What is claimed is:

1. A display device comprising:

a display panel comprising a plurality of light emitting diodes and a plurality of pixel driver circuits for driving the plurality of light emitting diodes;

a panel driver configured to control operations of the plurality of pixel driver circuits, the panel driver comprising a plurality of driver integrated circuits (ICs) and a first switching element;

a timing controller comprising a second switching element; and a plurality of signal transmission lines connecting the first switching element and the second switching element, wherein the timing controller is configured to:

control the first switching element and the second switching element to transmit an image data signal from the timing controller to the panel driver through a signal transmission line of the plurality of signal transmission lines during a first time period and to not receive a state data signal from the panel driver to the timing controller during the first time period, and control the first switching element and the second switching element to receive the state data signal regarding the display panel from the panel driver through the signal transmission line of the plurality of signal transmission lines during a second time period different from the first time period and to not transmit the image data signal from the timing controller to the panel driver during the second time period.

2. The display device of claim 1, wherein the timing controller is further configured to control the first switching element and the second switching element to select any one of the plurality of signal transmission lines to transmit the image data signal or receive the state data signal.

3. The display device of claim 1, wherein the panel driver further comprises the plurality of driver ICs connected by a daisy chain method, wherein based on a first driver IC among the plurality of driver ICs receiving the image data signal from the timing controller, the first driver IC is configured to transmit the received image data signal to a second driver IC directly connected to the first driver IC among the plurality of driver ICs, and wherein based on the second driver IC receiving the image data signal from the first driver IC, the second driver IC is configured to transmit the state data signal regarding the display panel to the timing controller.

4. The display device of claim 1, wherein the display panel is divided into a plurality of groups according to a number of a plurality of pixels constituting the display panel, and wherein the first switching element is connected to the plurality of signal transmission lines corresponding to each of the plurality of groups, and is connected to the plurality of driver ICs included in each of the plurality of groups.

5. The display device of claim 1, wherein the second time period is shorter than the first time period.

6. The display device of claim 1, wherein the state data signal comprises error information of the display panel and monitoring information of the display panel.

7. The display device of claim 1, wherein the display device is a modular display device comprising a plurality of display modules that are physically connected to each other, and wherein each of the plurality of display modules includes the display panel and the panel driver.

8. The display device of claim 1, wherein the display panel further comprises a plurality of pixels arranged in a form of a matrix, each of the plurality of pixels comprising an R sub pixel including a red light emitting diode, a G sub pixel including a green light emitting diode, and a B sub pixel including a blue light emitting diode, and wherein the plurality of pixel driver circuits are formed with respect to each of the R sub pixel, the G sub pixel, and the B sub pixel.

9. The display device of claim 1, wherein the display panel is driven by a passive matrix method through the panel driver.

10. A controlling method of a display device, the controlling method comprising:

controlling a first switching element included in a panel driver and a second switching element included in a timing controller to transmit through a signal transmission line of a plurality of signal transmission lines connecting the timing controller and the panel driver, an image data signal from the timing controller to the panel driver during a first time period and to not receive, by the timing controller, a state data signal from the panel driver during the first time period, the plurality of signal transmission lines connecting the first switching element and the second switching element; and controlling the first switching element and the second switching element to receive, by the timing controller, the state data signal regarding a display panel from the panel driver through the signal transmission line of the plurality of signal transmission lines during a second time period different from the first time period and to not transmit the image data signal from the timing controller to the panel driver during the second time period.

11. The controlling method of the display device of claim 10, further comprising:

controlling the first switching element included in the panel driver and the second switching element included in the timing controller to select any one of the plurality of signal transmission lines to transmit the image data signal or receive the state data signal.

12. The controlling method of the display device of claim 11, wherein the display panel is divided into a plurality of groups according to a number of a plurality of pixels constituting the display panel, and wherein the first switching element is connected to the plurality of signal transmission lines corresponding to each of the plurality of groups, and is connected to a plurality of driver ICs included in each of the plurality of groups.

13. The controlling method of the display device of claim 10, further comprising:

based on a first driver integrated circuit (IC) among a plurality of driver ICs included in the panel driver receiving the image data signal from the timing controller, transmitting the received image data signal from a first driver IC to a second driver IC directly connected to the first driver IC among the plurality of driver ICs; and based on the second driver IC receiving the image data signal from the first driver IC, receiving at the timing controller the state data signal regarding the display panel from the second driver IC.

14. The controlling method of the display device of claim 10, wherein the second time period is shorter than the first time period.

15. The controlling method of the display device of claim 10, wherein the state data signal comprises error information of the display panel and monitoring information of the display panel.

16. The controlling method of the display device of claim 10, wherein the display device is a modular display device comprising a plurality of display modules that are physically connected to each other, and wherein each of the plurality of display modules includes the display panel and the panel driver.

17. The controlling method of the display device of claim 10, wherein the display panel further comprises a plurality of pixels arranged in a form of a matrix, each of the plurality of pixels comprising an R sub pixel including a red light emitting diode, a G sub pixel including a green light emitting diode, and a B sub pixel including a blue light emitting diode, and wherein pixel driver circuits controlled by the panel driver are formed with respect to each of the R sub pixel, the G sub pixel, and the B sub pixel.

18. The controlling method of a display device of claim 10, wherein the display panel is driven by a passive matrix method through the panel driver.

* * * * *